United States Patent [19]

Ryu

[11] 4,275,052

[45] Jun. 23, 1981

[54] PROCESS FOR PREPARING HIGH SURFACE AREA ALUMINAS

[75] Inventor: Ji-Yong Ryu, Ramsey, N.J.

[73] Assignee: UOP Inc., Des Plaines, Ill.

[21] Appl. No.: 146,946

[22] Filed: May 2, 1980

[51] Int. Cl.$^3$ .............................................. C01F 7/04
[52] U.S. Cl. ................................. 423/628; 423/630; 252/466 PT; 252/466 J
[58] Field of Search ................ 423/625, 628, 630, 631

[56] References Cited

U.S. PATENT DOCUMENTS

| | | | |
|---|---|---|---|
| 3,773,691 | 11/1973 | Leach | 423/630 |
| 3,898,322 | 8/1975 | Leach | 423/630 |
| 3,975,509 | 8/1976 | Royer et al. | 423/630 |
| 3,975,510 | 8/1976 | Leach et al. | 423/630 |
| 4,024,231 | 5/1977 | Ziegenhein | 423/630 |
| 4,098,874 | 7/1978 | Mitsche et al. | 423/630 |

FOREIGN PATENT DOCUMENTS

45-17298  6/1970  Japan ........................ 423/630

*Primary Examiner*—Herbert T. Carter
*Attorney, Agent, or Firm*—James R. Hoatson, Jr.; Gregory J. Mancuso; William H. Page, II

[57] ABSTRACT

High surface area alumina, and a method of preparing them. More specifically, a method of preparing aluminas having a surface area of from about 300 square meters per gram to about 700 square meters per gram, by preparing a first solution of an aluminum alkoxide and an organic solvent selected from the group consisting of ethers, ketones, aldehydes, and mixtures thereof, admixing the first solution with a second solution comprising water and an organic solvent selected from the group consisting of ethers, ketones, aldehydes, and mixtures thereof, to form a solid material, and drying and calcining the solid material to recover alumina. Also, an alumina with an average micropore diameter of from about 20 angstroms to about 100 angstroms, and a total pore volume of from about 0.35 ml/g to about 1 ml/g.

11 Claims, No Drawings

PROCESS FOR PREPARING HIGH SURFACE AREA ALUMINAS

BACKGROUND OF THE INVENTION

1. Field of the Invention

The field of art to which this invention relates is alumina and its method of manufacture. More specifically, the claimed invention relates to a method of preparing a high surface area alumina particularly suitable for use as a catalyst, by the hydrolysis of aluminum alkoxides. The claimed invention further relates to a method of producing a high surface area alumina in an organic solvent environment by the hydrolysis of aluminum alkoxides.

2. Description of the Prior Art

Alumina has a variety of uses, including catalysts and catalyst supports. Alumina is particularly suitable in applications requiring particles of particular surface area, pore volume and pore diameter. In catalytic applications, the physical and structural properties of the alumina catalyst or support influence significantly the activity and durability of the catalyst. The pore structure of a catalyst, including the pore size distribution and the pore volume, determines to a substantial degree the extent and accessibility of catalytic surface area available for contact of the catalytic material and the reactants. Catalytic activity is often a function of the rate of diffusion of reactants and products in and out of the interstices of a catalyst. Thus, increased pore size may facilitate the diffusion of reactants and reaction products in and out of the interstices of a catalyst and consequently result in increased catalytic activity. However, pore size alone does not influence catalytic activity. Catalytic activity is a function also of surface area available as a reaction site. It is desirable to obtain a catalyst with an optimal balance of surface area and pore size.

The same structural characteristics which influence catalyst activity also can influence physical characteristics of the catalyst, such as durability and density. Generally, catalysts with low density and high crush strength and attrition resistance are desired. Low density catalysts are usually desirable since low density catalysts generally have a low thermal mass and consequently are able to respond more rapidly to temperature changes. High crush strength and attrition resistance is particularly desired of catalysts which are used in large volumes or in moving or fluidized bed operations.

Alumina is a particularly desired catalyst and catalyst support material since it exists in forms with high porosity and surface area, and it is structurally stable over a wide range of temperatures. Alumina has been produced by many processes, including the water of hydrolysis of aluminum alkoxides. However, most processes involving the water of hydrolysis of aluminum alkoxides have produced alumina having surface areas lower than about 280 $m^2/g$. Some processes have produced alumina with surface areas as high as about 400 $m^2/g$, but the catalyst products of those processes have had a substantially higher macropore volume compared to the method of this invention. Furthermore, the prior art methods which were able to produce aluminas with surface areas of up to about 400 $m^2/g$ resulted in aluminas with micropore structures very different from the micropore structures of aluminas produced by the method of this invention. (U.S. Pat. No. 3,907,512) For example, to obtain an alumina with a surface area of about 400 $m^2/g$, the prior art shows that the resulting alumina has no micropores of a diameter of 40 angstroms or less, and has an average micropore diameter (pores less than 600 angstroms in diameter) of about 150 angstroms. (U.S. Pat. No. 3,987,155)

It has been theorized that high surface area aluminas are difficult to obtain because the surface tension of the gas-liquid interface which forms within the pores of the alumina during drying and calcination causes many pores to collapse. (U.S. Pat. No. 2,249,767)

A method of preparing alumina commonly termed the "aerogel technique" was developed to minimize surface tension forces and thus produces aluminas of up to about 616 $m^2/g$. (S. J. Teichner, et. al., Advances in Colloid and Interface Science, 5(1976), 245.) However, the aerogel technique has many serious limitations. Its most fundamental drawbacks are that because it requires the use of very high temperatures and pressures, the technique is complex and the necessary equipment is expensive. The application of the aerogel technique on a commercial scale therefor is very limited.

What has been desired, but not shown by the prior art, is a convenient method of producing an alumina which has a surface area of between about 300 and 700 $m^2/g$ and an average micropore diameter of between about 20 and 100 angstroms. The method of this invention is such a method.

SUMMARY OF THE INVENTION

Accordingly, it is an object of this invention to provide a method for the production of alumina having a surface area and average pore diameter as recited above. A further object of this invention is a method of producing such alumina from organic solutions of aluminum alkoxides. A still further object of this invention is a method of producing such alumina from organic solutions of aluminum alkoxides by the hydrolysis of aluminum alkoxides.

In brief summary, my invention is, in one embodiment, a method of preparing a high surface area alumina comprising the steps of preparing a first solution of an aluminum alkoxide and an organic solvent selected from the group consisting of ethers, ketones, aldehydes, and mixtures thereof, admixing the first solution with a second solution comprising water and an organic solvent selected from the group consisting of ethers, ketones, aldehydes, and mixtures thereof, to form a solid material, and drying and calcining the solid material to recover alumina having a surface area of from about 300 square meters per gram to about 700 square meters per gram.

In another embodiment, my invention is the foregoing method wherein said aluminum alkoxide is aluminum sec-butoxide.

In yet another embodiment, my invention is alumina prepared by the foregoing method.

Other objects and embodiments of my invention are discussed more compeletely below.

DESCRIPTION OF THE INVENTION

The aluminum alkoxide used in the method of this invention can be any of the aluminum alkoxides which have been found satisfactory in the water hydrolysis of aluminum alkoxides to form alumina. The aluminum alkoxides must be capable of forming a solution with the organic solvent selected as discussed below. As a matter of convenience, aluminum alkoxides in the lower boiling point range are preferred, since a portion of the alcohol reaction product of the aluminum alkoxide hydrolysis reaction is removed by vaporization. It is desired that residual organic compounds in the aluminum hydroxide reaction product be minimized. It is also preferred that the aluminum alkoxide selected be soluble in the alcohol reaction product of the hydrolysis reaction. Especially preferred are commercially available aluminum alkoxides having fewer than about 6 carbon atoms, such as aluminum sec-butoxide.

The hydrolysis reaction of aluminum sec-butoxide and water can be represented by the stoichiometric equation:

$$(CH_3CH_2CHOCH_3)_3Al + 3H_2O \rightarrow Al(OH)_3 + 3(CH_3CH_2CHOHCH_3)$$

The aluminum hydroxide so produced is commonly referred to as aluminum trihydrate, and can be represented alternatively as $Al_2O_3 \cdot 3H_2O$. It can be seen from the above equation that three moles of water are required for each mole of aluminum alkoxide in the hydrolysis reaction to produce aluminum trihydrate. Alumina with satisfactory surface area and pore volume characteristics can be obtained with various mole ratios of water to aluminum alkoxide. Exact stoichiometric ratios are not required. It is preferred that the molar ratio of water to aluminum alkoxide be in the range of from about 1.5:1 to about 4:1. It is especially preferred that the molar ratio of water to aluminum alkoxide be in a range of from about 2.5:1 to about 3.5:1. As discussed below, the particular form of the alumina produced by the method of this invention is influenced by variables in addition to the mole ratio of water to aluminum alkoxide.

The first step in the method of this invention is the preparation of a solution of an aluminum alkoxide and an organic solvent and a solution of water and an organic solvent. The organic solvent or solvents used must be capable of forming solutions both with the aluminum alkoxide and with the water. In addition, in instances in which the aluminum alkoxide and the water are present in solutions of different organic solvents, those solvents must be capable of forming solutions with one another. The degree of mutual solubility required of the organic solvents, aluminum alkoxides, and water is that degree necessary to form complete solutions in the relative amounts used in the method of this invention. Factors besides solubility or miscibility which influence the choice of organic solvents include molecular weight, vapor pressure and polarity. It is desired that the alumina of this invention contain little or nor organic material. Therefore, it is desirable to select an organic solvent which will be completely or substantially removed during the drying and calcination steps in the method of this invention. Generally, low molecular weight, high vapor pressure organic solvents will be more completely removed by drying and calcination than higher molecular weight organic solvents with lower vapor pressures. Suitable organic solvents include ethers, ketones, aldehydes, and mixtures thereof. Preferred organic solvents include ethers, ketones and aldehydes having fewer than about 6 carbon atoms. Especially preferred are acetone, dimethyl ether, and diethyl ether.

Many organic solvents display only limited solubility with water. In some circumstances it may be desirable to reduce the total volume of the water-organic solvent solution used in practicing this invention by the selection of a solvent which has a high degree of solubility with water, such as acetone. Although conventional practice would predict that use of a highly polar solvent would result in alumina of greatly reduced surface area, the method of this invention suffers from no such limitation. The surface area of the alumina of this invention does not appear to be a function of the surface tension or polarity of the solvent used in the method of this invention.

The amounts of organic solvent used in the preparation of the aluminum alkoxide solution and the water solution of the method of this invention should be sufficient to completely dissolve the particular amounts of aluminum alkoxide and water to be present in their respective solutions. Dilute solutions of aluminum alkoxide and water are preferred. It appears that the advantageous results of this invention may derive in part from the intimate commingling on a molecular scale of aluminum alkoxide and water during the course of admixing the water solution with the aluminum alkoxide solution. It is preferred that the solution of aluminum alkoxide and organic solvent comprise from about 5 vol. % to about 50 vol. % aluminum alkoxide. It is especially preferred that the solution comprise from about 10 vol. % to about 25 vol. % aluminum alkoxide. It is preferred that the solution of water and organic solvent comprise from about 1 vol. % to about 50 vol. % water. It is especially preferred that the solution of water and organic solvent comprise from about 5 vol. % water to about 25 vol. % water.

The two solutions can be prepared at any convenient temperature and pressure. It is preferred that the solutions be prepared at ambient temperature and pressure.

After preparation of the water solution and the aluminum alkoxide solution, the next step in the method of this invention is the admixing of the two solutions. The purpose of the admixing operation is the hydrolysis of the aluminum alkoxide to form a solid material, which can thereafter be dried and calcined to form a high surface area alumina. The admixing operation can be performed at any convenient temperature and pressure. Preferred conditions are ambient temperature and pressure. To enhance the intimate commingling on a molecular scale of aluminum alkoxide and water, it is preferred that the resulting admixture be continuously mixed or agitated during the admixing operation. Such mixing or agitation can be accomplished by any conventional or convenient means. In a batch mixing operation an especially convenient means of conducting the admixing is to mechanically stir one solution while admixing into it in the other solution. In a continuous mixing operation a convenient means of conducting the admixing is to simultaneously pump the two solutions through a single mixing means such as an in-line mixer.

The next step in the method of this invention is the drying of the solid material resulting from the admixing operation. Drying may be accomplished by any conventional or convenient means, such as an oven, a vacuum apparatus, or a belt dryer which passes through a flow of hot gases. To minimize the amount of liquid which must be removed during the drying operation, and also to minimize the amount of organic material or residue which remains in contact with the solid material after drying, it is preferred to separate the solid material from the mixture resulting from the admixing operation. Such separation can be by any conventional or convenient means. An especially convenient means is the passage of the mixture resulting from the admixing operation through a filter medium to collect a filter cake which is thereafter dried as indicated above.

To avoid possible undesirable effects of contact of the solid material with moisture in the air, it is preferred that exposure of the solid material to water vapor and moist air be minimized. Contact of the solid material with water can be minimized by drying the solid material in a water-free atmosphere. One method of doing so is to separate the solid material from the mixture resulting from the admixing operation by vacuum filtration, and thereafter drying the solid material under reduced pressure by passing dry gas over the solid material. It is preferred to dry the solid material in a substantially moisture-free environment at temperatures from about ambient temperature to about 400° C.

To facilitate drying of the solid material, the organic solvent portion of the mixture resulting from the admixture of the water solution and the aluminum alkoxide solution can be displaced with an organic solvent having a higher vapor pressure. Appropriate organic solvents include those specified above as satisfactory for preparing the aluminum alkoxide and water solutions. Any conventional or convenient method of displacing one organic solvent with another can be used. One convenient method is to collect the solid material by filtration as discussed above, slurry the solid material with the organic solvent of higher vapor pressure, collect the solid material of that slurry by filtration, and then dry the solid material as discussed above. Displacement of the organic solvent of the mixture resulting from the admixture of the water solution and the aluminum alkoxide solution with an organic solvent of higher vapor pressure can facilitate drying and lower the amount of organic residue which remains on the solid material after drying. These results would be especially notable in circumstances in which the vapor pressures of the former organic solvent and the latter organic solvent are substantially different. Such a displacing operation is preferred in circumstances in which drying difficulty may be encountered or organic residue in the alumina product is unduly high for the particular application anticipated. Such a displacing operation is not required for the practice of the method of this invention.

The final step in the method of this invention is the calcining of the dried solid material to yield an alumina having a high surface area. The calcination can be by any convenient or conventional means. It is preferred to calcine the solid material at temperatures within a range of from about 200° C. to about 650° C., for a period of from about 0.5 hours to about 6 hours. Calcination temperature directly influences the structure of the alumina product. Calcination temperatures below about 100° C. tend to yield an alumina trihydrate product. Calcination temperatures in excess of about 250° C. tend to yield aluminas having one or fewer water molecules associated with each alumina molecule. Intermediate calcination temperatures tend to yield alumina monohydrate.

The surface area of the alumina product is influenced by the amount of water vapor with which the solid material comes into contact during drying and calcining. For this reason, it is preferred to conduct both operations in a water-free environment. One method of doing so is to dry and calcine the solid material under vacuum. An alternate method is the use of a dry gas.

The alumina of this invention has an average micropore diameter, with respect to pores of from 10 to 600 angstroms in diameter, of from about 20 angstroms to about 100 angstroms. The total pore volume of the alumina, with respect to pores of from 10 to 600 angstroms in diameter, is from about 0.35 ml/g to about 1 ml/g. The surface area of the alumina of this invention is from about 300 square meters per gram to about 700 square meters per gram. Use of vacuum calcination, or other techniques which minimize contact of water vapor with the solid material, yields aluminas with surface areas of from about 550 square meters per gram to about 700 square meters per gram.

The alumina of this invention can be used in many different forms, including powders, spheres, extrudates, and pellets. Various sized powders can be produced by grinding to the desired size the alumina of this invention by any conventional or convenient means. Spheroidal alumina particles can be prepared by the Marumerizing method, or by other convenient or conventional means.

Extrudates and pellets of various sizes and shapes can be prepared by using any conventional or convenient means. Utilizing a conventional screw type extruder, the dough or paste is processed through a die plate generally comprising orifice openings in the 1/32-½ inch diameter range to form generally cylindrical particles. The freshly extruded material may be collected in the form of strands of indefinite or random lengths to be dried and subsequently broken into extrudate particles; or the freshly extruded material may be cut into random or predetermined lengths of from about ¼ inch to about ½ inch and subsequently dried; or the freshly extruded material may be formed into spheres, for example, by the process whereby the extrudate strands are collected in a spinning drum—the strands becoming segmented and spheroidized under the spinning influence of the drum. In any case, the extrudate is dried and subsequently calcined in the manner described above.

Spheres, pellets, and extrudates can be produced with surface areas in the range of from about 300 square meters per gram to about 450 square meters per gram, with pore volumes in the range of from about 0.4 ml/g to about 0.7 ml/g, and with pore diameters in the range of from about 35 to about 75 angstroms (pore volume and pore diameter measured with respect to pores in the range of from 10 to 600 angstroms in diameter).

The alumina of this invention, in the shape of particles such as spheres, extrudates, or pellets, is advantageously employed as a support or carrier material for other catalytic components to promote various hydrocarbon conversion reactions including dehydrogenation of specific hydrocarbons or petroleum fractions, isomerization of specific hydrocarbons or petroleum fractions, hydrocracking of lower molecular weight hydrocarbons such as occur in the kerosene and gas oil boiling range, and the oxidation of hydrocarbons to provide first, second and third stage oxidation products. Reaction conditions employed in the various hydrocarbon conversion reaction are those heretofore practiced. For example, alkylaromatic isomerization reaction conditions include a temperature of from about 100° C. to about 535° C., a pressure of from about atmospheric to about 1500 psig, a hydrogen to hydrocarbon mole ratio of from about 0.5 to about 20, and a liquid hourly space velocity of from about 0.5 to about 20. Likewise, a typical hydrocracking operation is effected at a pressure of from about 100 to about 1500 psig, a temperature of from about 200° C. to about 500° C., a liquid hourly space velocity of from about 4 to about 10, and a hydrogen circulation rate of from about 1000 to about 10,000 standard cubic feet per barrel of hydrocarbon charge (SCF/Bbl).

The alumina of this invention is of particular advantage as a support or carrier material for a platinum group metal component, alone or in combination with a tin component, a rhenium component, a germanium component and/or a cobalt component to yield an improved reforming catalyst. The platinum group metal component is suitably composited with the support or carrier material by impregnation and/or ion-exchange techniques familiar to the art. For example, a soluble platinum group compound, that is, a soluble compound of platinum, palladium, rhodium, ruthenium, osmium and/or iridium, is prepared in aqueous solution, and the alumina particles soaked, dipped, or otherwise immersed therein. Suitable platinum group compounds include platinum chloride, chloroplatinic acid, ammonium chloroplatinate, dinitrodiaminoplatinum, palladium chloride, and the like. It is common practice to impregnate the support carrier material with an aqueous chloroplatinic acid solution acidified with hydrochloric acid to facilitate an even distribution of platinum on the support or carrier material.

The support or carrier material is preferably maintained in contact with the impregnating solution at ambient temperature conditions, suitably for at least about 30 minutes, and the impregnating solution thereafter evaporated to dryness. For example, a volume of the particulate support or carrier material is immersed in a substantially equal volume of impregnating solution in a steam jacketed rotary dryer and tumbled therein for a brief period at about room temperature. Steam is thereafter applied to the dryer jacket to expediate evaporation of the impregnating solution and recovery of substantially dry impregnated particles. Thus, a further embodiment of this invention relates to an alumina support or carrier material characterized by a surface area of from about 300 to about 450 m$^2$/g and a pore volume of from about 0.4 to about 0.7 ml/g in the pore diameter range of from about 35 to about 75 angstroms, said alumina being impregnated with from about 0.1 to about 2.0 wt. % platinum.

As heretofore stated, the alumina composition of this invention is useful as a support or carrier material for a platinum group metal component alone or in combination with a tin component, a rhenium component, a germanium component and/or a cobalt component. The tin, rhenium, germanium and/or cobalt components may be composited with the support or carrier material in any conventional or otherwise convenient manner. Suitable methods include impregnation and/or ion-exchange of the support or carrier material with a suitable compound of one or more of said components in any desired sequence, with or without intermediate calcination. In the impregnation of the support or carrier material, it is a preferred practice to impregnate one or more of said components on said support or carrier material simultaneously with the platinum group metal component from a common impregnating solution. For example, when the added component is tin, stannic chloride is conveniently and advantageously prepared in common solution with chloroplatinic acid, the concentration of each component therein being sufficient to yield a catalyst product containing from about 0.01 wt. % to about 2.0 wt. % platinum and from about 0.1 wt. % to about 5.0 wt. % tin calculated as the elemental metal. Similarly, when the desired added component is rhenium, perrhenic acid and chloroplatinic acid can be prepared in a common aqueous solution to impregnate the support or carrier material, suitably with from about 0.01 wt. % to about 2.0 wt. % platinum and from about 0.01 wt. % to about 2.0 wt. % rhenium. Thus, another embodiment of this invention concerns an alumina support or carrier material characterized by a surface area of from about 300 to about 450 m$^2$/g and a pore volume of from about 0.4 to about 0.7 ml/g in the pore diameter range of from about 35 to about 75 angstroms, said alumina being impregnated with from about 0.01 wt. % to about 2.0 wt. % rhenium.

The tin, rhenium, germanium and/or cobalt components and particularly the tin, germanium and cobalt components are advantageously composited with the alumina by including a suitable acid salt thereof in the aforementioned suspension prepared by admixing a finely divided alpha-alumina monohydrate with an aqueous alkaline solution. For example, an acid salt of tin such as stannous or stannic chloride, may be admixed with said suspension and serve not only as a precursor of the desired tin component, but also as the metal salt of a strong acid as herein contemplated. Following the extrusion process and subsequent calcination, the alumina is obtained comprising the tin component in intimate combination therewith and suitable for further impregnation and/or ion-exchange to incorporate, for example, the platinum group metal component.

The final catalyst composite generally will be dried at a temperature of from about 95° C. to about 315° C. for a period of from about 2 to about 24 hours or more, and finally calcined at a temperature of from about 375° C. to about 595° C. in an air atmosphere for a period of from about 0.5 hours to about 10 hours in order to convert the catalytic component substantially to the oxide form. Although not essential, it is preferred that the resultant calcined catalytic composite be subjected to a substantially water-free reduction step prior to its use in the conversion of hydrocarbons. This step is designed to insure a uniform and finely divided dispersion of the catalytic component throughout the carrier material. Preferably, substantially dry hydrogen is used as the reducing agent in this step. The reducing agent is contacted with the calcined catalyst at a temperature of from about 425° C. to about 650° C. and for a period of from about 0.5 hours to about 10 hours. This reduction treatment may be performed in situ as part of a start-up sequence if precautions are taken to predry the plant to a substantially water-free state and if substantially water-free hydrogen is used.

The reforming of gasoline boiling range petroleum fractions to improve the octane rating thereof is a process well known to the petroleum refining industry. The petroleum fraction may be a full boiling range gasoline fraction boiling in the 10° C. to 220° C. range, although it is more often what is called a naphtha fraction, a gasoline fraction having an initial boiling point of from about 65° C. to about 120° C. and an end boiling point of from about 175° C. to about 220° C. Reforming conditions generally include a pressure of from about 50 to about 1000 psig and a temperature of from about 425° C. to about 595° C. The catalyst of this invention permits a stable reforming operation to be effected in a preferred pressure range of from about 50 to about 350 psig, utilizing a hydrogen/hydrocarbon mole ratio of from about 0.5 to about 10 and a liquid hourly space velocity of from about 0.5 to about 10. Preferably, a temperature of from about 485° C. to about 565° C. is employed.

The following examples are presented in illustration of certain preferred embodiments of this invention, and an illustration of the improved alumina catalyst support or carrier material derived from the practice of this invention. The examples are not intended as an undue limitation on the generally broad scope of the invention as set out in the appended claims.

EXAMPLE I

This example represents one embodiment of this invention. In this example, 4.80 grams of aluminum sec-butoxide solution were dissolved in 110 cc's of anhydrous diethyl ether, in a laboratory flask to form a first solution. The aluminum sec-butoxide used was a commercial grade solution comprising about 95 wt.% aluminum sec-butoxide, with the balance being impurities including water and alcohols. A second solution was prepared in a laboratory flask by mixing 0.94 grams of deionized water with 60 cc's of anhydrous diethyl ether. The vapor space above the first solution was purged with nitrogen to provide a moisture-free inert atmosphere. The second solution was then admixed with the first solution by slow addition to the first solution to hydrolyze the aluminum sec-butoxide. During the admixing operation, the resulting mixture was continuously stirred by means of a magnetic stirrer, and the nitrogen atmosphere was maintained. After completing the admixing operation, the resulting mixture was filtered through a medium fritted disc filter funnel to recover a white filter cake. The filter cake was washed three times with 50 cc's of anhydrous ether each time, and thereafter dried at room temperature in a nitrogen stream. The dried filter cake was calcined at 450° C. for 2 hours under a vacuum. With the exception of the drying and calcining steps, all operations were conducted at ambient temperature and pressure.

EXAMPLE II

This example represents a second embodiment of this invention. In this example, 91.0 grams of commercial grade 95 wt. % aluminum sec-butoxide were dissolved in 365 cc's of acetone in a laboratory flask to form a first solution. The acetone used contained about 0.5 wt. % of water. A second solution was prepared in a laboratory flask by mixing 16.73 grams of deionized water with 2000 cc's of acetone containing about 0.5 wt. % water. The vapor space above the first solution was purged with nitrogen. The second solution was then admixed with the first solution by slow addition to the first solution to hydrolyze the aluminum sec-butoxide. During the admixing operation, the resulting mixture was continuously stirred by means of a magnetic stirrer, and a nitrogen atmosphere was maintained. After completing the admixing operation, the resulting mixture was allowed to sit under quiescent conditions for 1 hour to allow a precipitate to settle. Thereafter, clear liquid above the precipitate was decanted from the flask, 350 cc's of anhydrous diethyl ether was admixed with the material remaining in the flask, and the resulting admixture was allowed to sit under quiescent conditions overnight. Thereafter the resulting admixture was filtered to recover a light yellow filter cake. The filter cake was washed once with 250 cc's of anhydrous diethyl ether, and thereafter dried at room temperature in a nitrogen stream.

A first portion of the dried filter cake was calcined at 450° C. for 2 hours under vacuum.

A second portion of the dried filter cake was calcined at 220° C. for 2.5 hours, and thereafter at 300° C. for 3 hours, under vacuum.

A third portion of the dried filter cake was calcined under vacuum at 220° C. for 2.5 hours, at 300° C. for 3 hours, and thereafter in air at atmospheric pressure at 450° C. for 2.17 hours.

With the exception of the drying and calcining steps, all operations were conducted at ambient temperature and pressure.

EXAMPLE III

This example represents a third embodiment of this invention. In this example, 254 grams of commercial grade 95 wt. % aluminum sec-butoxide was dissolved in 817 grams of anhydrous diethyl ether in a laboratory flask to form a first solution. A second solution was prepared in a laboratory flask by mixing 49.5 grams of deionized water, 226 cc's of acetone (about 0.5 wt. % water), and 449 cc's of anhydrous diethyl ether. The vapor space above the first solution was purged with nitrogen to provide an inert atmosphere. The second solution was then admixed with the first solution by slow addition to the first solution to hydrolyze the aluminum sec-butoxide. During the admixing operation, the resulting mixture was continuously stirred by means of a magnetic stirrer, and the nitrogen atmosphere was maintained. After admixing approximately two-thirds of the second solution with the first solution, difficulty was encountered in stirring because of the precipitate forming as a result of the admixing operation. To alleviate the stirring difficulty, 364 grams of anhydrous diethyl ether were admixed with the first solution containing the precipitate. Thereafter, admixing of the second solution with the first solution continued. After completing the admixing operation, the resulting mixture was filtered to recover a white filter cake. The filter cake was dried without washing, at room temperature in a nitrogen stream.

A first portion of the dried filter cake was calcined at 450° C. for 2 hours under a vacuum.

A second portion of the dried filter cake was calcined at 450° C. for 3.2 hours in air, at atmospheric pressure.

A third portion of the dried filter cake was calcined at 220° C. for 2 hours, and thereafter at 450° C. for 3.5 hours, under vacuum.

A fourth portion of the dried filter cake was calcined in exactly the same manner as the third portion, and thereafter ground to a powder. A mixture of 4 cc's of concentrated aqueous ammonium hydroxide and 100 cc's of anhydrous isopropanol was prepared, and thereafter 27 cc's of the mixture was admixed with the powder. The resulting admixture was pelletized. The pellets were calcined at 650° C. for 1.2 hours in air, at atmospheric pressure.

With the exception of the drying and calcining steps, all operations were performed at ambient temperature and pressure.

EXAMPLE IV

This example represents another embodiment of this invention. In this example, 284 grams of 95 wt. % commercial grade aluminum sec-butoxide were dissolved in 908 grams of anhydrous diethyl ether to form a first solution. A second solution was prepared by admixing 60.45 grams of deionized water, 240 cc's of acetone containing about 0.5 wt. % water, and 454 grams of anhydrous diethyl ether. The vapor space above the first solution was purged with nitrogen to provide a moisture-free inert atmosphere. The second solution was thereafter admixed with the first solution by slow addition to the first solution to form a resulting mixture. During the course of the admixing of the second solution with the first solution, the resulting mixture was continuously stirred by means of a magnetic stirrer, and the nitrogen atmosphere was maintained. During the course of the admixing operation 360 cc's of anhydrous diethyl ether were admixed with the resulting mixture to remedy stirring difficulties. After completing the admixing operation of the first and second solutions, the resulting mixture was filtered to recover a white filter cake. The filter cake was washed once with a volume of anhydrous diethyl ether approximately equal to that of the filter cake, and thereafter dried at room temperature in a nitrogen stream.

A first portion of the dried filter cake was calcined at 450° C. for 2 hours under a vacuum.

A second portion of the filter cake was calcined at 220° C. for 4 hours and thereafter at 300° C. for 2.3 hours, under vacuum. The calcined filter cake was then ground to a powder, the powder was admixed with anhydrous isopropanol, and thereafter pelletized. The pellets were calcined at 650° C. for 1.5 hours in air at atmospheric pressure.

With the exception of the drying and calcining steps, all operations were performed at ambient temperature and pressure.

EXAMPLE V

This example represents another embodiment of this invention. In this example, 263 grams of commercial grade 95 wt. % aluminum sec-butoxide were dissolved in 908 grams of anhydrous diethyl ether, to form a first solution. A second solution was prepared by admixing 54.78 grams of deionized water, 275 cc's of acetone containing about 0.5 wt. % water, and 454 grams of anhydrous diethyl ether. The vapor space above the first solution was purged with nitrogen to provide a moisture-free inert environment. The second solution was then admixed with the first solution by slow addition of the first solution. During the course of the admixing operation, the resulting mixture was continuously stirred with a magnetic stirrer, and the nitrogen atmosphere was maintained. During the admixing operation 454 grams of anhydrous diethyl ether were admixed with the resulting mixture to remedy stirring difficulties. After completion of the admixing of the first and second solutions, the resulting mixture was filtered to recover a white filter cake. The filter cake was washed once with a volume of anhydrous diethyl ether approximately equal to that of the filter cake, and thereafter dried at room temperature in a nitrogen stream.

A first portion of the dried filter cake was calcined at 220° C. for 3 hours and thereafter at 350° C. for 2.5 hours, under vacuum.

A second portion of the filter cake was calcined in exactly the same manner as the first, and 54.19 grams of the calcined second portion were admixed with 178 cc's of a mixture of 200 cc's of anhydrous isopropanol and 5.2 cc's of concentrated ammonium hydroxide. The resulting admixture was extruded through a 1/16 inch hole, and thereafter calcined at 550° C. for 1.4 hours in air under atmospheric pressure.

With the exception of the drying and calcining steps, all operations were performed at ambient temperature and pressure.

EXAMPLE VI

The calcined alumina particles of the foregoing examples were analyzed to determine their respective surface areas, pore volumes, and average pore diameters. Pore volume and pore diameter were determined by standard nitrogen adsorption techniques. The method depends on the condensation of nitrogen in the pore of the particles, and is effective for measuring pores with pore diameters in the range of 10 to 600 angstroms. Surface area also was determined by nitrogen adsorption analysis. Nitrogen adsorption techniques are discussed by H. W. Daeschner and F. H. Stross, Anal. Chem. 34, (1962), and by S. Brunauer, P. Emmett, and E. Teller, J. Am. Chem. Soc., V. 60, p. 309 (1938).

The results are tabulated in the following table. The alumina particles of Example I are designated I. The alumina particles of Example II are designated IIa with respect to particles resulting from the first portion of the dried filter cake, IIb with respect to particles resulting from the second portion of the dried filter cake, and IIc with respect to particles resulting from the third portion of the dried filter cake. The alumina particles of Example III are designated IIIa with respect to particles resulting from the first portion of the dried filter cake, IIIb with respect to particles resulting from the second portion of the dried filter cake, IIIc with respect to particles resulting from the third portion of the dried filter cake, and IIId with respect to pellets resulting from the fourth portion of the dried filter cake. The alumina particles of Example IV are designated IVa with respect to particles resulting from the first portion of the dried filter cake, and IVb with respect to pellets resulting from the second portion of the dried filter cake. The alumina particles of Example V are designated Va with respect to particles resulting from the first portion of the dried filter cake, and Vb with respect to extrudate resulting from the second portion of dried filter cake.

The Table sets forth the mole ratio of water to aluminum sec-butoxide used in preparing the first and second solutions; the organic solvent in which the aluminum sec-butoxide and the water were dissolved in preparing the first and second solutions; the organic solvent used to wash the alumina filter cake; calcination conditions; alumina surface area (SA); alumina total pore volume with respect to pores in the 0 to 600 angstrom diameter range (PV); and the alumina average port diameter in the 0 to 600 angstrom diameter range (PD).

TABLE

| | Water/Aluminum Alkoxide Mole Ratio | Organic Solvent for Aluminum Alkoxide | Water | Calcination | SA $m^2/g$ | PV $ml/g$ | PD A |
|---|---|---|---|---|---|---|---|
| I | 2.8 | Ether | Ether | Vacuum | 621 | 0.67 | 43 |
| IIa | 3 | Acetone | Acetone | Vacuum | 677 | 0.43 | 25 |
| IIb | 3 | Acetone | Acetone | Vacuum | 630 | 0.43 | 27 |
| IIc | 3 | Acetone | Acetone | Air | 472 | 0.44 | 37 |
| IIIa | 3.3 | Ether | Ether & Acetone | Vacuum | 613 | 0.69 | 45 |

TABLE-continued

| | Water/Aluminum Alkoxide Mole Ratio | Organic Solvent for Aluminum Alkoxide | Organic Solvent for Water | Calcination | SA m²/g | PV ml/g | PD A |
|---|---|---|---|---|---|---|---|
| IIIb | 3.3 | Ether | Ether & Acetone | Air | 535 | 0.74 | 55 |
| IIIc | 3.3 | Ether | Ether & Acetone | Vacuum | 578 | 0.74 | 51 |
| IIId | 3.3 | Ether | Ether & Acetone | Air | 363 | 0.60 | 66 |
| IVa | 3.1 | Ether | Ether & Acetone | Vacuum | 661 | 0.86 | 52 |
| IVb | 3.1 | Ether | Ether & Acetone | Air | 428 | 0.76 | 71 |
| Va | 3 | Ether | Ether & Acetone | Vacuum | 627 | 0.96 | 61 |
| Vb | 3 | Ether | Ether & Acetone | Air | 353 | 0.80 | 91 |

Several very distinct and unexpected characteristics of the alumina of this invention are evident upon examination of the Table. The most important observation is that the method of this invention is capable of conveniently producing alumina of very high surface area and very desirable average pore diameter. The hydrolysis reaction and the drying step can be performed at temperatures and pressures much less severe than those required by the aerogel technique. High surface area catalysts with a substantial portion of their pores in the micropore range have many uses in the chemical and petroleum arts.

The second important observation is that the surface area of the alumina of this invention does not appear to be dependent on the polarity or surface tension of the organic solvents used in the method of this invention. Conventional practice predicts that presence in the alumina during drying of a highly polar solvent such as acetone would result in an alumina of reduced surface area compared to alumina which was exposed instead to a less polar solvent.

The third important observation is that the characteristics of the alumina of this invention do not appear to be dependent on the ratio of water to aluminum alkoxide used in the method of this invention.

Other observations can be made which distinguish this invention from the prior art. Although calcination of the alumina of this invention in air rather than in a vacuum results in an alumina having a lower surface area, the pore volume and pore diameter characteristics of the alumina are not substantially altered. Further, the alumina which results from calcination in air displays a high surface area relative to aluminas produced by conventional methods. Extending the duration of calcination likewise reduces the surface area without affecting total pore volume or average pore diameter.

I claim as my invention:

1. A method of preparing high surface area alumina comprising the steps of:
   (a) preparing a first solution containing from about 5 vol. % to about 50 vol. % of an aluminum alkoxide and an organic solvent selected from the group consistng of ethers, ketones, aldehydes, and mixtures thereof;
   (b) admixing with said first solution a second solution comprising from about 1 vol. % to about 50 vol. % water and an organic solvent selected from the group consisting of ethers, ketones, aldehydes and mixtures thereof to form a solid material, said solutions being admixed in amounts to provide a molar ratio of water aluminum alkoxide in the range of from about 1.5:1 to about 4:1; and
   (c) drying and calcining said solid material to form alumina having a surface area of from about 300 square meters per gram to about 700 square meters per gram.

2. The method of claim 1 wherein the molar ratio of said aluminum alkoxide in said first solution to said water in said second solution is from about 1:2.5 to about 1:3.5.

3. The method of claim 1 wherein said aluminum alkoxide has fewer than 6 carbon atoms.

4. The method of claim 1 wherein said aluminum alkoxide is aluminum sec-butoxide.

5. The method of claim 1 wherein said organic solvent of step (a) and said organic solvent of step (b) have fewer than about 6 carbon atoms.

6. The method of claim 1 wherein said organic solvent of step (a) and said organic solvent of step (b) are the same organic solvent.

7. The method of claim 6 wherein said organic solvent is acetone.

8. The method of claim 6 wherein said organic solvent is an ether with fewer than 5 carbon atoms.

9. The method of claim 1 wherein said alumina has an average micropore diameter, with respect to pores of from 10 to 600 angstroms in diameter, of from about 20 angstroms to about 100 angstroms.

10. The method of claim 9 wherein said alumina has a total pore volume, with respect to pores of from 10 to 600 angstroms in diameter, of from about 0.35 ml/g to about 1 ml/g.

11. The method of claim 1 wherein said solutions are admixed at approximately ambient temperature and pressure and said solid material is calcined at a temperature of from about 200° C. to about 650° C.

* * * * *